Feb. 22, 1944.  C. H. MITCHELL  2,342,359

LEVEL

Filed Aug. 17, 1942

INVENTOR
Charles Herbert Mitchell,
By Ralph Burch
Attorney

Patented Feb. 22, 1944

2,342,359

UNITED STATES PATENT OFFICE 2,342,359

LEVEL

Charles Herbert Mitchell, Woodstock, Ontario, Canada

Application August 17, 1942, Serial No. 455,135

1 Claim. (Cl. 33—218)

This invention relates to inclinometers and more particularly to a gravity operated degree level whereby perpendiculars and horizontals may be ascertained and also various angles of inclination may be measured.

The present invention is characterized by a novel indicator which is mounted upon sensitive bearings and which carries at its periphery suitable graduations for determining angular inclinations throughout 360 degrees. The device is further characterized by a frame provided with openings whereby the indicator may be read from either side or from above. Another feature of the invention is the provision of means for adjusting the indicator and for adjusting the dials enclosing the indicator to assure accuracy in its registration of angular inclination.

The invention has then, for its primary object, the provision of a level as, and for the purpose described which involves a minimum of working parts and which may be easily and accurately adjusted. Still other objects of a more general nature are to provide a device of the character set forth which is comparatively inexpensive, accurate and durable.

With the above noted objects and others in view which may appear as the description proceeds the invention resides in the novel construction, combination and arrangement of cooperating parts as hereinafter more specifically set forth, claimed and shown in the accompanying drawing forming part of this application and in which:

Figure 1:
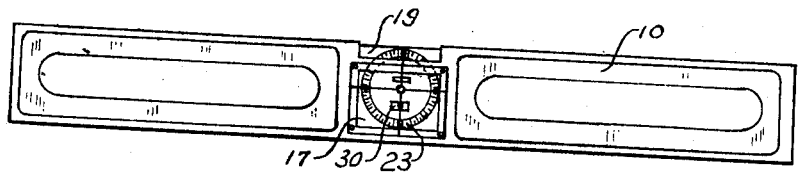
Fig. 1 is a side elevational view of my invention.

Referring more in detail to the drawing in which similar reference characters designate corresponding parts throughout the several views it will be seen that the invention resides in a frame 10, as best shown in Figure 1, it being understood that I do not intend the scope of the invention to be limited to the frame per se; the said frame is intended only to define the subject matter with the exception of the center portion within which the indicator is disposed.

The frame 10, has rectangular openings 11, cut out of each side which openings are entirely surrounded by a recessed seating 12. The top is cut out and a portion of the sides at 13, leaving a bridge 14, on each side, which bridge forms part of the seating 12. At either end of the cut out top I provide a recessed seating 15, having vertical slots 16, extending part of the length of the seating 15, on either side of the seating and to a depth in the frame equal to the depth of the said bridge below the top surface of the frame. The structure herein described is preferably, but not necessarily, made of opaque or colored plastic material in a single, homogeneous unit as for example, from a mould.

The rectangular openings 11, on either side are each covered with a thick, transparent plate 17, which is disposed in the recessed seatings 12, and secured by screws 18, at each corner.

The top opening 13, is covered with a transparent channel-shaped plate 19, the top portion thereof being extended beyond the extremities of the side walls and having slots 20, cut therein. The extended portions rest in the recesses 15, but do not wholly cover the recess to the end that space for adjustment is provided by loosening the securing screws 21, and moving the cover endwise. The side walls of the channel-shaped cover rest on the top of the bridge 14, and lie in the vertical slots 16. When the cover is adjusted it may be sealed with cement 22, at the joinder line of the said bridge and said cover. From the foregoing it will be seen that I have adequately sealed the interior of the frame whilst providing ample sighting area for the indicator.

Figures 2, 3:
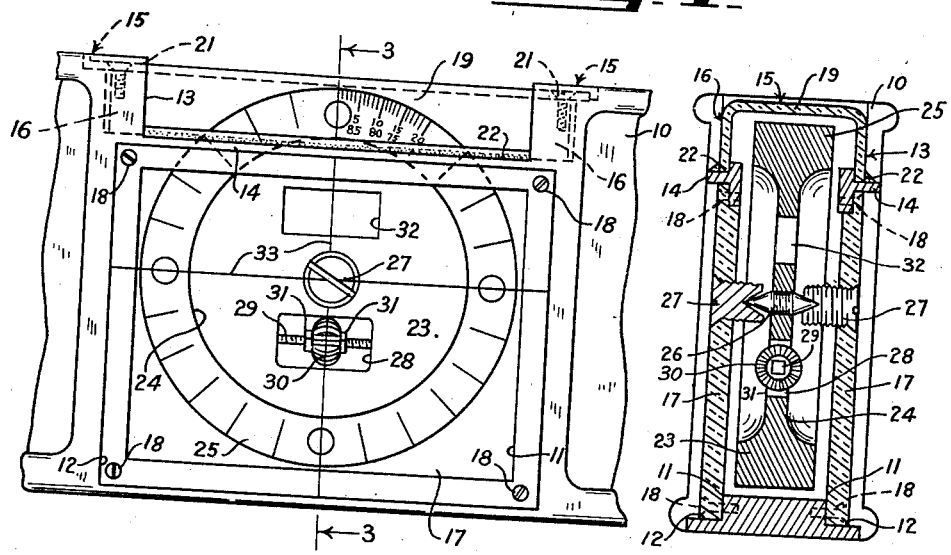
Fig. 2 is a detailed side elevational view of the indicator and related parts.
Fig. 3 is a cross-sectional view on the line 3—3 of Figure 2.
Figure 4:
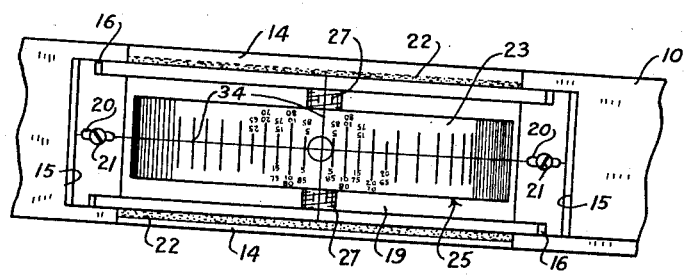
Fig. 4 is a detailed top plan view of the indicator and related parts.

The indicator consists of an annular disk 23, having dished-out or concave sides 24, leaving a heavy peripheral rim 25. The disk is mounted for rotation by means of an axle 26, located centrally through the disk. The extremities of the axle are tapered to a point and rest in complementary, female bearings 27 which are screwed into the thick transparent cover plates 17, as best seen in Figure 3, wherein one bearing is in section and the opposite in elevation for clarity. What is normally the bottom half of the disk is apertured at 28, and a threaded shaft 29, secured therein on which an adjusting nut 30, and cooperating lock nuts 31, are mounted. The upper half of the disk is apertured at 32, to lighten that half of the disk and provide quicker action. From the foregoing it will be seen that I have provided sensitive bearings on which the disk rotates and arranged for the adjustment of the disk whereby accuracy of registration may be obtained by the indicator elements.

The disk is graduated on the peripheral edges and surface thereof and consists of four sets of degree markings from 0° to 90° on each quarter which markings are also reversed, that is each degree marking is indicated from each extremity of the arc such as 5° and 85° or 25° and 65°, etc. By this arrangement the operator is enabled to quickly obtain his desired figure working from either direction and from the horizontal or vertical. The side cover plates 17, have transverse hair lines 33, marked thereon and by adjusting the member 30, the peripheral edge degree markings may be accurately aligned with the vertical and for horizontal hair lines. The hair lines 34, on the top cover plate are aligned by loosening the screws 21, and adjusting the plate as hereinbefore described.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

A level comprising a body having a centrally disposed recess, a cross bar bridging the recess on each side thereof, a channel shaped transparent top plate disposed in the open end of the recess with its side walls seated on said cross bars, said top plate being adjustable longitudinally of said cross bars, transparent panes covering the sides of said recess below said cross bars, bearings mounted centrally of said panes, a rotatable disk having an axle journaled in said bearings, the periphery and sides of said disk having degree graduations marked thereon, said top plate and panes having hair lines marked thereon adapted to register with the graduations on said disk.

CHARLES HERBERT MITCHELL.